United States Patent
Bourbeau

[11] Patent Number: 6,155,582
[45] Date of Patent: Dec. 5, 2000

[54] BICYCLE COUPLING DEVICE

[76] Inventor: Charle Bourbeau, 30 Aeroport Blvd, Bromont, Canada, J2L 1S6

[21] Appl. No.: 09/161,660

[22] Filed: Sep. 29, 1998

[51] Int. Cl.[7] .................................................. B62K 27/00
[52] U.S. Cl. .......................... 280/204; 280/231; 280/239; 280/292
[58] Field of Search ................................... 280/204, 231, 280/239, 292, 400, 414.5

[56] References Cited

U.S. PATENT DOCUMENTS

| | | | |
|---|---|---|---|
| 5,039,120 | 8/1991 | Stowe | 280/204 |
| 5,318,318 | 6/1994 | Berner et al. | 280/204 |
| 5,482,304 | 1/1996 | Smith | 280/204 |
| 5,695,208 | 12/1997 | Baechler et al. | 280/204 |
| 5,743,543 | 4/1998 | Chiu | 280/231 |
| 5,749,592 | 5/1998 | Marchetto | 280/292 |
| 5,785,335 | 7/1998 | George | 280/239 |
| 5,842,710 | 12/1998 | Couture | 280/292 |
| 5,860,662 | 1/1999 | Bartoshesky et al. | 280/239 |

FOREIGN PATENT DOCUMENTS

| | | | |
|---|---|---|---|
| 872374 | 6/1942 | France | 280/231 |
| 1077941 | 11/1954 | France | 280/239 |

*Primary Examiner*—Daniel G. DePumpo

[57] ABSTRACT

A coupling device for coupling an adult bicycle to a child's bicycle. The coupling device includes a linking bar having a generally flattened "S"-shaped configuration such that the front wheel of the child's bicycle is in a spaced relationship relative to the ground surface when the child's bicycle is being towed by the adult's bicycle. The linking bar can be readily attached to both the adult's bicycle and the child's bicycle by respective attachment components. A releasable locking structure is provided for stabilizing the handle bar of the child's bicycle thus allowing a child to grasp onto the a handle bar for stability while being pulled by the adult's bicycle.

18 Claims, 8 Drawing Sheets

BICYCLE COUPLING DEVICE

FIELD OF THE INVENTION:

The present invention relates to the field of bicycle accessories and is particularly concerned with a device for coupling a pair of bicycles.

BACKGROUND OF THE INVENTION

With relatively recent trends towards overall well being through fitness, exercise and leisure activities the use of bicycles is becoming increasingly popular. Concomitantly, there also exists a trend for families to perform outdoor activities together. Hence, the use of bicycles for family oriented rides is becoming part of our contemporary lifestyle.

For families with young children, the child typically rides in a jump seat or a trailer attached to the bicycle of the parent. As the child grows older, the latter no longer wishes to ride in the jump seat or trailer but rather wishes to independently ride a child bicycle. During the transition period that may last for several years, the child has limited physical capabilities compared to that of a young adult and thus, the stamina of many adults will generally outlast that of their young children.

Consequently, the bicycle ride must be planned within the capabilities of the child so as not to exhaust the latter. The ride must either be kept short or planned with frequent resting periods. Furthermore, the ride must be maintained at the child's pace which may be considerably slower then that of an adult. This type of situation can be frustrating both to the child pressured to perform beyond his or her capacity and for the adult who may fell restrained. Both the child and the adult will thus be prevented from enjoying together a relatively long ride.

Various types of devices have been proposed in the past in an attempt to circumvent the hereinabove mentioned problems. For example, U.S. Pat. No. 5,067,738 teaches a single wheel trailer for carrying an occupant. The frame of the trailer includes a towbar member and two symmetrical fork members for retaining the single wheel. A hitch connected to a driving bicycle tows the trailer. A pedal assembly coupled to the frame enables the occupant to power the trailer. Although this structure enables the occupant of the trailer to either help power the bicycle or could be towed by the prime mover, it does not allow the occupant of the trailer to ride independently from the prime mover even for short periods of time.

The prior art also discloses various types of towing bars for coupling two bicycles in a tandem-like configuration. For example, U.S. Pat. No. 4,261,592 issued Apr. 14, 1981 and naming Jacques Dusseuil as inventor, discloses a coupling device wherein a coupling bar is fixed to each of the two bicycles making up the tandem by an universal joint specifically designed to increase stability of the tandem unit. This type of structure intended to be used with bicycles of substantially equal height, both ridden by adults, is not suitable for situations wherein an adult forms a tandem with a child's bicycle.

Indeed, the configuration of the towbar disclosed in U.S. Pat. No. 4,261,592 is such that the steering wheel of the rearwardly positioned bicycle is in contact with the ground surface. Improper alignment of such rear bicycle steering wheel may potentially create a biasing force that will tend to render the tandem unstable and thus potentially dangerous. Also, the front wheel of the rearwardly positioned bicycle even though useless and even potentially dangerous as a steering component being in contact with the ground surface creates a frictional and a drag force that increases the load on the frontwardly positioned bicycle attempting to pull the rearwardly positioned bicycle in situations when for example a child wishes to rest.

Accordingly, there exists a need for an improved bicycle-coupling device specifically intended for coupling an adult bicycle to a child's bicycle.

SUMMARY OF THE INVENTION

It is an object of the present invention to provide an improved coupling device for bicycles. In accordance with an embodiment of the present invention there is provided a coupling device for coupling a first bicycle to a second bicycle for enabling the first bicycle riding on ground surface to pull the second bicycle, the first and second bicycles respectively having first and second front wheels, first and second rear wheels, first and second seat posts and first and second bead tubes, the coupling device comprising a linking bar having a generally elongated configuration, the linking bar defining a bar first longitudinal end and an opposed bar second longitudinal end; a first attachment means coupled to the linking bar adjacent the first longitudinal end for releasably attaching the linking bar to the first bicycle; a second attachment means coupled to the linking bar adjacent the second longitudinal end for releasably attaching the linking bar to the second bicycle; the linking bar being configured and sized such that when the ling bar is attached to the first and second bicycles respectively by the first and second attachment means with the first front and rear wheels contacting the ground surface the second rear wheel also contacts at ground surface but the second front wheel is in a spaced relationship relative to the ground surface.

Preferably, the first attachment means includes a first bicycle attachment component configured so as to be attachable to a segment of the first bicycle and a first bar attachment component extending from the bar first longitudinal end, the first bar attachment component being configured so as to be pivotally and releasably attachable to the first bicycle attachment component.

Conveniently, the first bicycle attachment component includes a clamp configured so as to be releasably clamped around a section of the first bicycle. Preferably the clamp includes a pair of jaw members, each of the jaw members defining a generally arcuate segment configured and sized for encircling at least a section of the first seat post, the arcuate segment defining an arcuate segment first peripheral edge and an arcuate segment second peripheral edge; a jaw linking segment extending from the arcuate segment first peripheral edge, the linking segments of both the jaw members being adapted to cooperate for linking together the jaw members; a jaw connecting segment extending from the arcuate segment second peripheral edge, the connecting segment of both the jaw members being adapted to cooperate for connecting the first bar attachment component to the first bicycle attachment component.

Conveniently, each of the jaw linking segments has a generally flat configuration and a linking segment aperture extending therethrough whereby the first seat post is adapted to be sandwiched between the arcuate segments of the jaw members and the linking segment apertures are adapted to be put substantially in register with each other for receiving the stem section of a linking bolt having a linking bolt head and a corresponding linking nut; the linking bolt head and the linking nut being adapted to squeeze the linking segments towards each other.

Preferably, a substantially flat connecting tongue extends from the bar first longitudinal end, the connecting tongue having a tongue aperture extending therethrough; each of the jaw connection segments having a generally flat configuration and a connecting segment aperture extending therethrough whereby the first seat post is adapted to be sandwiched between the arcuate segments and the connecting tongue between the jaw connecting segments; the connecting segments apertures and the tongue aperture being adapted to be put in register with each other so as to allow insertion of the stem section of a connecting bolt therein, the connecting bolt having a connecting bolt head and a connecting nut for squeezing the connecting segments against the connecting tongue.

Conveniently, a knob is mounted on the connecting bolt head for facilitating manual rotation of the connecting bolt. Preferably, the device further comprises a generally cylindrical sleeve components sized so as to be insertable around the first seat post between the arcuate segments and the first seat post, the sleeve component being provided with a friction enhancing means formed on at least one of its surfaces for reducing relative movement between the first seat post and the arcuate segments.

Preferably, the second attachment means include a second bicycle attachment components configured so as to be attachable to a segment of the second bicycle and a second bar attachment component extending from the bar second longitudinal end, the second bar attachment component being configured so as to be releasably attachable to the first bicycle attachment component.

Conveniently, the second bicycle attachment component include a gripping component for gripping the second head tube and a connecting sleeve mounted on the gripping component, the connecting sleeve defining a corresponding sleeve channel; the second bar attachment component including a generally elongated connecting stem extending at an angle from the bar second longitudinal end, the connecting stem being configured and sized so as to be substantially fittingly slideable within the sleeve channel.

Preferably, the gripping component includes a stabilizing plate having a pair of lateral stabilizing flanges extending substantially perpendicularly therefrom, each stabilizing flange having a generally arcuate stabilizing recesses formed thereon; each stabilizing recess being configured and sized for fittingly receiving at least a portion of the circumference of the second head tube; the gripping component further including a generally "U" shaped stabilizing component releasably mounted on the stabilizing plate for cooperating with the stabilizing recesses so as to encircle and frictionally engage the second head tube.

Conveniently, the stabilizing plate has a pair of stabilizing apertures extending theretbrough and wherein the generally "U" shaped stabilizing component includes a generally "U" shaped bolt having threaded end sections and a corresponding pair of stabilizing nuts, the end sections being adapted to extend through the stabilizing apertures and the stabilizing nuts being adapted to threadaly engage the threaded end sections.

Preferably, the device further comprises a releasable locking means mounted on the connecting sleeve for releasably locking the connecting stem within the sleeve channel. Conveniently, the releasable locking means includes a locking bolt threadably mounted on the connecting sleeve and adapted to frictionally engage the connecting stem when the latter extends through the sleeve channel. Conveniently, the second connecting means further includes a handle bar locking means for releasably locking the handle bar in a predetermined rotational orientation relative to the second head tube, the handle bar locking means being attached to the linking bar.

Preferably, the handle bar locking means includes a generally elongated and substantially rigid rod defining a rod first end and a longitudinally opposed rod second end; a first rod attachment means mounted adjacent the rod first end for attaching the rod to the linking bar; a second rod attachment means for releasably attaching the rod to the second handle bar.

Conveniently, the linking bar has a generally flattened "S" shaped configuration defining a bar first segment extending into a bar second segment, the bar second segment extending into a bar third segment; whereby when the linking bar is in use, the bar first segment is adapted to extend in a generally horizontal direction and in an overlying relationship relative to the first rear wheel the bar second segment is adapted to extend substantially rearwardly and downwardly relative to the bar first segment and the bar third segment is adapted to extend in a substantially horizontal direction and in an overlying relationship relative to the second front wheel.

In a preferred embodiment, the bar first segment has a length substantially in the range of 12", the bar second segment has a length substantially in the range of 20" and the bar third segment has a length substantially in the range of 10", the bar first and second segments defining a first angle therebetween having a value substantially in the range of 60°; the bar second and third segment defining a second angle therebetween having a value substantial in the range of 60°.

In accordance with the present invention there is provided a coupling device for coupling a first bicycle to a second bicycle for enabling the first bicycle riding on ground surface to pull the second bicycle, the first and second bicycles respectively having first and second front wheels, first and second rear wheels, first and second seat posts and first and second head tubes, the coupling device comprising: a linking bar having a generally elongated configuration, the linking bar defining a bar first longitudinal end and an opposed bar second longitudinal end; a first attachment means coupled to the linking bar adjacent the first longitudinal end for releasably attaching the liking bar to the first bicycle; a second attachment means coupled to the linking bar adjacent the second longitudinal end for releasably attaching the linking bar to the second bicycle; the linking bar being configured and sized so that when the first attachment means is attached to the first seat post and the second attachment means is attached to the second head tube the second front wheel is in a spaced relationship relative to the ground surface.

Advantages of the present invention include the fact that the coupling device not only enables the occupant of the bicycle being towed to either help power the tandem or be towed by the prime mover but also enable the occupant of the bicycle being towed to ride independently from the prime mover. Thus for example a child going on a ride with a parent can first ride independently and then as the child becomes tired the bicycles can be coupled in a tandem-like fashion enabling the parent to tow the resting child.

Another advantage of the present invention is that when a pair of bicycles are coupled, the front wheel of the bicycle being pulled is in a spaced relationship relative to the ground surface. This spaced relationship reduces the frictional and drag forces that would otherwise create an additional load for the pulling rider. Also, since the front wheel of the bicycle being pulled is in a spaced relationship relative to the ground surface this eliminates the risk for the pulled bicycle steering wheel of creating a turning force that would destabilize the tandem.

A further advantage of the present invention resides in that the proposed coupling device includes a means for stabilizing the handlebars of the bicycle being pulled. The rider being pulled can thus use the handlebars for support. A still further advantage of the present invention resides in that the proposed coupling device is specifically configured for coupling a larger bicycle to a smaller bicycle.

The specific configuration of the towbar also allows the latter to be conveniently mounted to the frame of the larger bicycle when not in use without obstructing the use of the bicycle or creating an esthetically unpleasant effect. Thus, the towing bar may be conveniently brought along on a ride until a situation arises wherein it becomes desirable for the larger bicycle to pull the smaller bicycle.

Yet another advantage of the present invention resides in that the proposed coupling device is specifically designed so as to be readily mounted on most conventional bicycles without requiring special tooling or manual dexterity.

Furthermore, the proposed coupling device is made of relatively simple mechanical components conforming to conventional forms of manufacturing so as to provide a coupling device that will be economically feasible, long lasting and relatively trouble free in operation.

BRIEF DESCRIPTION OF THE DRAWINGS

An embodiment of the present invention will now be described, by way of example, in reference to the following drawings in which.

DETAILED DESCRIPTION OF THE DRAWINGS

Figure 1:
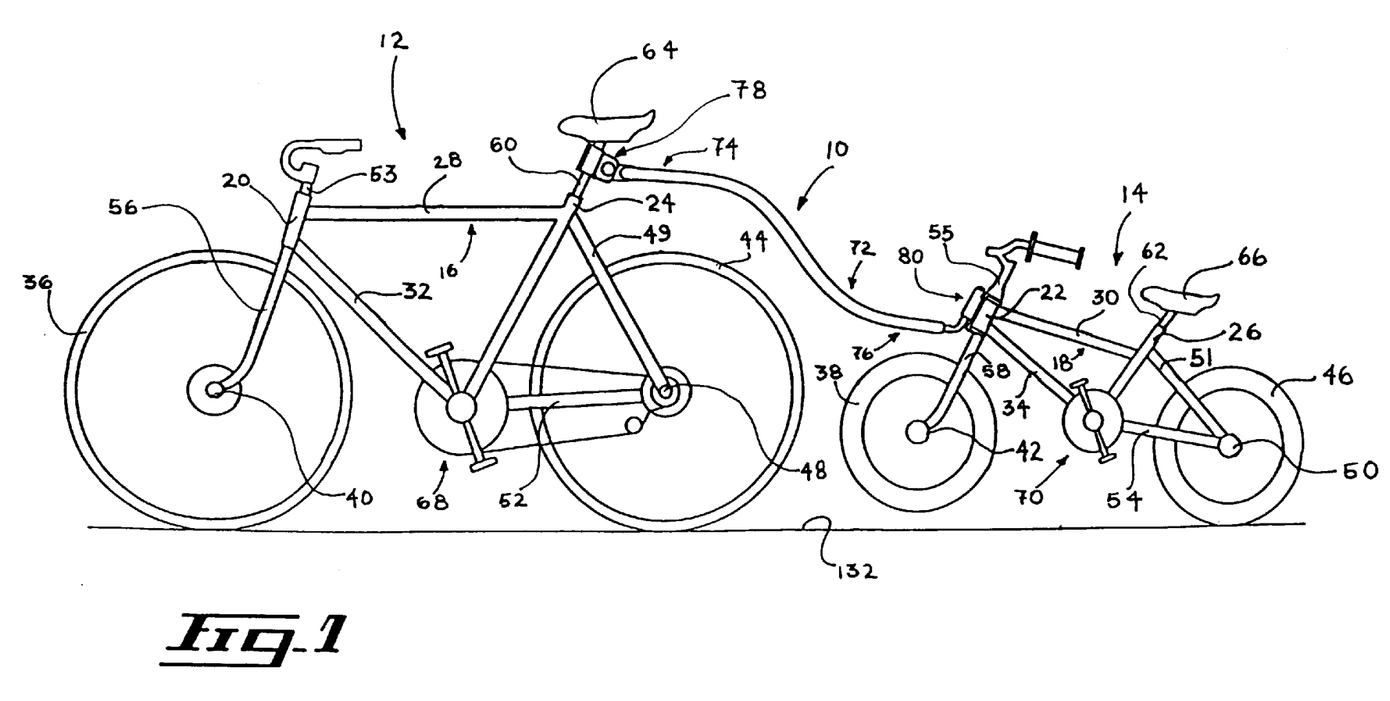
FIG. 1, in an elevational view, illustrates a child's bicycle being towed by an adult's bicycle using a coupling device in accordance with an embodiment of the present invention.

Referring to FIG. 1, there is shown a coupling device 10 in accordance with an embodiment of the present invention. The coupling device 10 is shown being used to couple in a tandem-like fashion a first bicycle 12 to a second bicycle 14. The first bicycle 12 is shown positioned frontwardly relative to the second bicycle 14.

Typically, the first and second bicycles 12 and 14 are respectively conventional adult and child bicycles. The first and second bicycles 12 and 14 respectively include first and second bicycle frames 16, 18. The first and second bicycle frames 16, 18 respectively include first and second head tubes 20, 22; first and second seat tubes 24, 26; first and second main tubes 28, 30 and first and second transversal tubes 32, 34.

The first and second bicycle frames 16, 18 respectively rotatably support first and second front wheels 36, 38 having respective first and second front axles 40, 42. The first and second bicycle frames 16 and 18 also respectively rotatably support first and second rear wheels 44, 46 having respective first and second rear axles 48, 50.

A pair of first and second seat stays 49, 51 extend substantially rearwardly and downwardly from an upper segment of their respective first and second seat tubes 24, 26 to the respective first and second rear axles 48, 50 on opposite sides of the first and second rear wheels 44, 46. A pair of first and second chain stays 52, 54 extend substantially rearwardly from a lower segment of the respective first and second seat tubes 24, 26 to the respective first and second rear axles 48, 50 on opposite sides of the first and second rear wheels 44, 46.

First and second handle bar axles 53, 55 are respectively pivotally mounted inside the first and second head tubes 20, 22. The first and second handle bar axles 53, 55 respectively extend integrally into first and second forked yokes 56, 58. First and second seat posts 60, 62 are telescopically inserted into their respective first and second seat tubes 24, 26. A corresponding pair of first and second seats 64, 66 are respectively attached to the distal end of the first and second seat posts 60, 62.

First and second drive mechanisms 68, 70 typically taking the form of pedals mechanically coupled to corresponding chain and sprockets assemblies are adapted to drive the respective first and second rear wheels 44, 46. It should be understood that the first and second bicycle 12 and 14 are hereinabove described only by a way of example and that the coupling device 10 could be used with other types of bicycles without departing from the scope of the present invention.

The coupling device 10 includes a linking bar 72. The linking bar 72 has a generally elongated configuration defining a bar first longitudinal end 74 and an opposed bar second longitudinal end 76. The coupling device 10 also includes first and second bicycle attachment means 78 and 80 for pivotally attaching the linking bar 72 respectively to the first bicycle 12 and the second bicycle 14. The first and second attachment means 78 and 80 are particularly well suited for ergonomical attachment and removal of the second bicycle 14 without the need for manual dexterity or special tooling.

Figure 2:
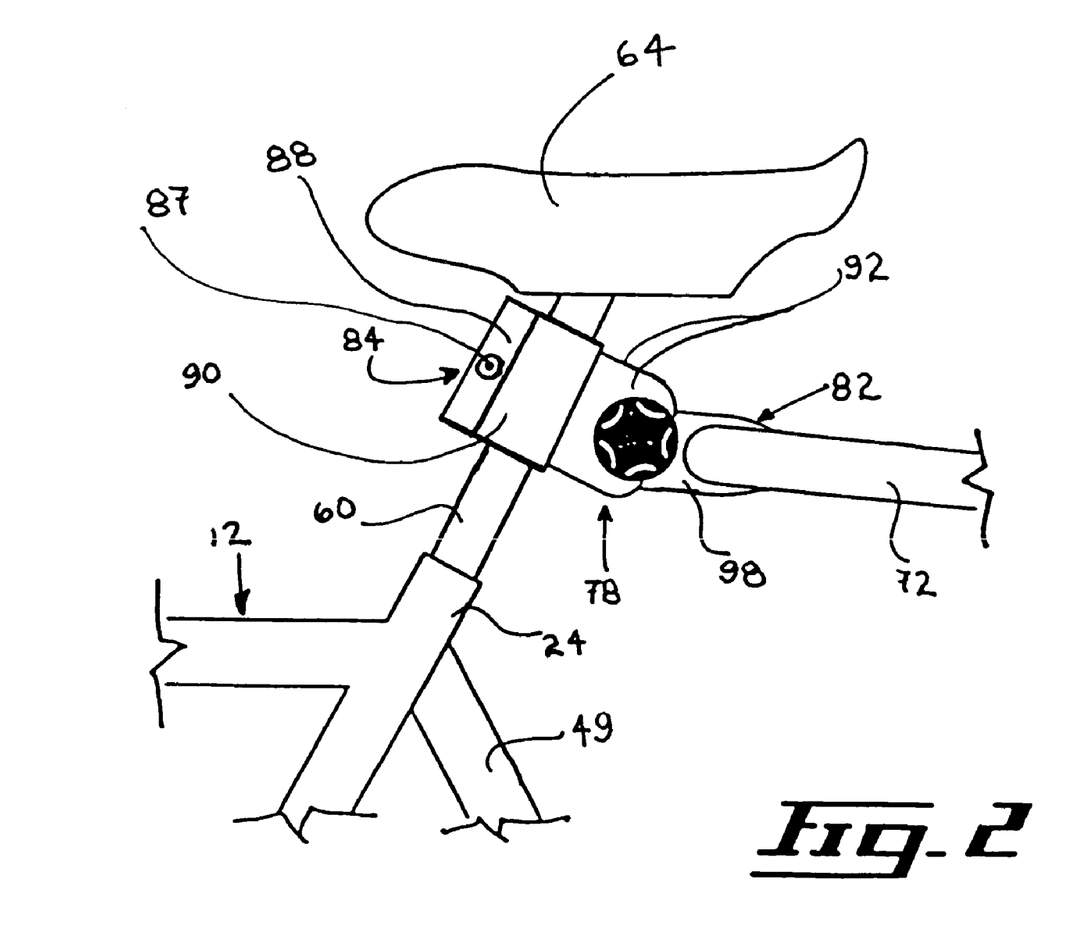
FIG. 2, in a partial elevational view with sections taken out, illustrates a first attachment means part of the coupling device shown in FIG. 1 being attached to a seat post part of the parent's bicycle.
Figure 3:
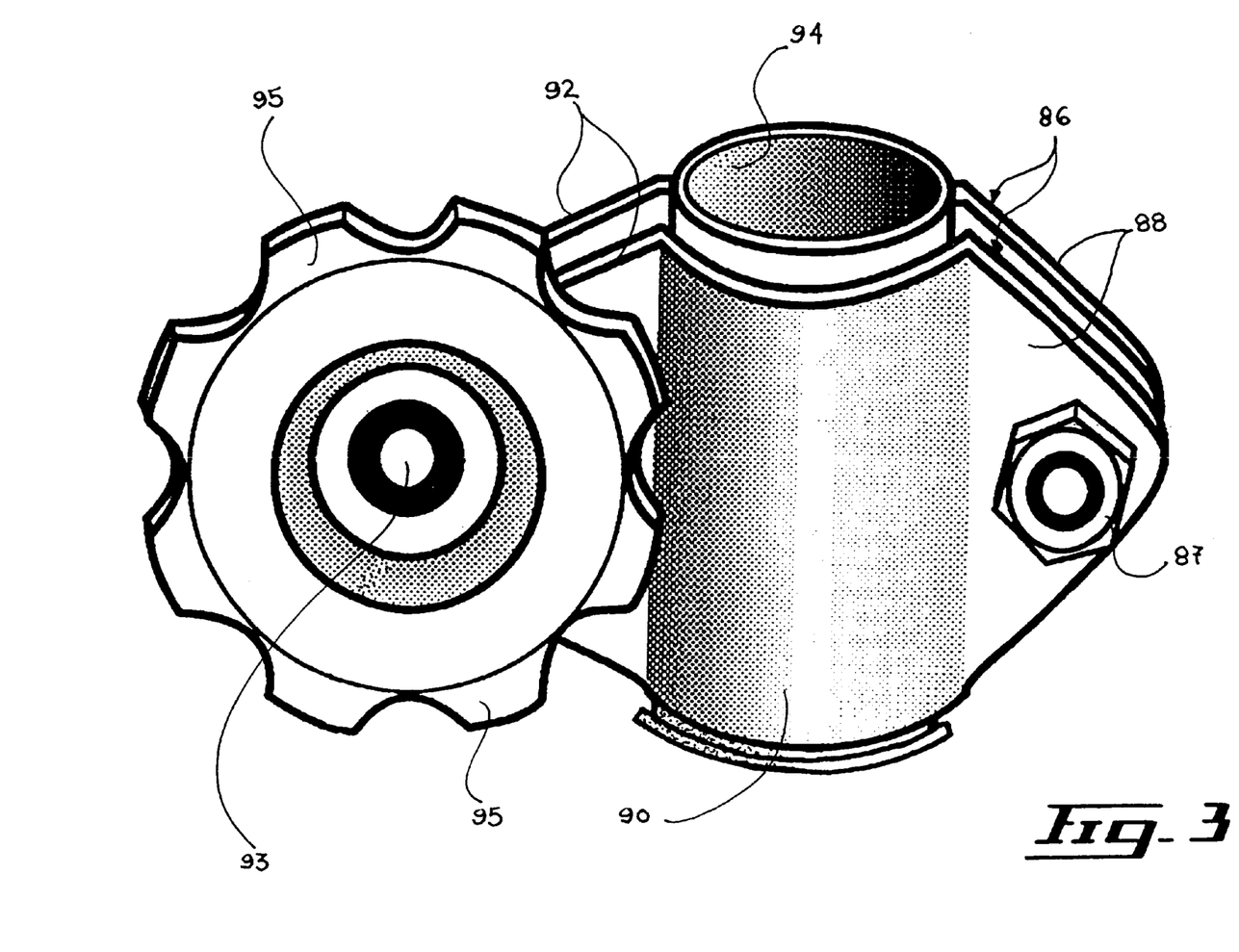
FIG. 3, in a perspective view, illustrates part of the first attachment means shown in FIG. 2.

Referring now more specifically to FIGS. 2 and 3, there is shown in greater details the first attachment means 78. The first attachment means 78 includes the first bicycle attachment component 84 configured so as to be attachable to a segment of the first bicycle 12. The first attachment means 78 also includes a first bar attachment component 82 extending from the bar first longitudinal end 74. The first bar attachment component 82 is configured so as to be pivotally and releasably attachable to the first bicycle attachment component 84.

The first bicycle attachment component 84 preferably includes a clamp configured so as to be releasably clamped around a section of the first bicycle 12. The clamp preferably includes a pair of jaw members 86. Each jaw member 86 defines a generally arcuate segment 90 configured and sized for encircling at least a section of the first seat post 60. The arcuate segment defines an arcuate segment first peripheral edge and an opposed arcuate segment second peripheral edge.

Each jaw member also defines a jaw-linking segment 88 extending from the arcuate segment first peripheral edge. The linking segments 88 of both jaw members 86 are adapted to cooperate for linking together the jaw members 86.

Each jaw member 86 further defines a jaw connecting segment 92 extending from the arcuate segment second peripheral edge. The jaw connecting segments 92 of both jaw members 86 are adapted to cooperate for securing the first bar attachment component 82 to the first bicycle attachment component 84.

Preferably each of the jaw linking segments 88 has a generally flat configuration and a linking segment aperture extending therethrough. In use, the first seat post 60 is adapted to be sandwiched between the arcuate segments 90 of the jaw members 86 and the linking segment apertures are adapted to be put substantially m register with each other for receiving a linking bolt 87. The head of the linking bolt 87 and a corresponding washer are adapted to squeeze the linking segments 88 towards each other.

A substantially flat connecting tongue 98 extends integrally from the bar first longitudinal end 78. The connecting tongue 98 has a tongue aperture 100 extending therethrough. Similarly, each of the jaw connecting segments 92 has a generally flat configuration and a connecting segment aperture extending therethrough.

In use, when the first seat post 60 is sandwiched between the arcuate segments 90 of the jaw members 86, the connecting segment apertures and the tongue aperture 100 are all aligned in registry with each other so as to allow for insertion of the stem portion of a connecting bolt 93. The head of the connecting bolt 93 and a corresponding connecting washer are used for squeezing the jaw connecting segments 92 towards each other.

A knob 95 is preferably mounted on the bolt head of the connecting bolt 93 for facilitating manual rotation of the connecting bolt 93. The knob 95 preferably defines a generally disc shaped configuration having finger receiving recesses formed on its peripheral edge.

The first attachment means 78 preferably further includes a generally cylindrical sleeves component 94 sized so as to be insertable between the arcuate segment 90 and the first seat post 60. The sleeve component 94 is preferably provided with a friction enhancing means formed on at least one and preferably both of its outer surfaces for increasing its friction so as to reduce the relative movement between the seat post 60 and the arcuate segments 90. The sleeves component 94 is preferably provided with a generally perpendicular peripheral flange extending integrally from its lower most peripheral edge.

Figure 4:
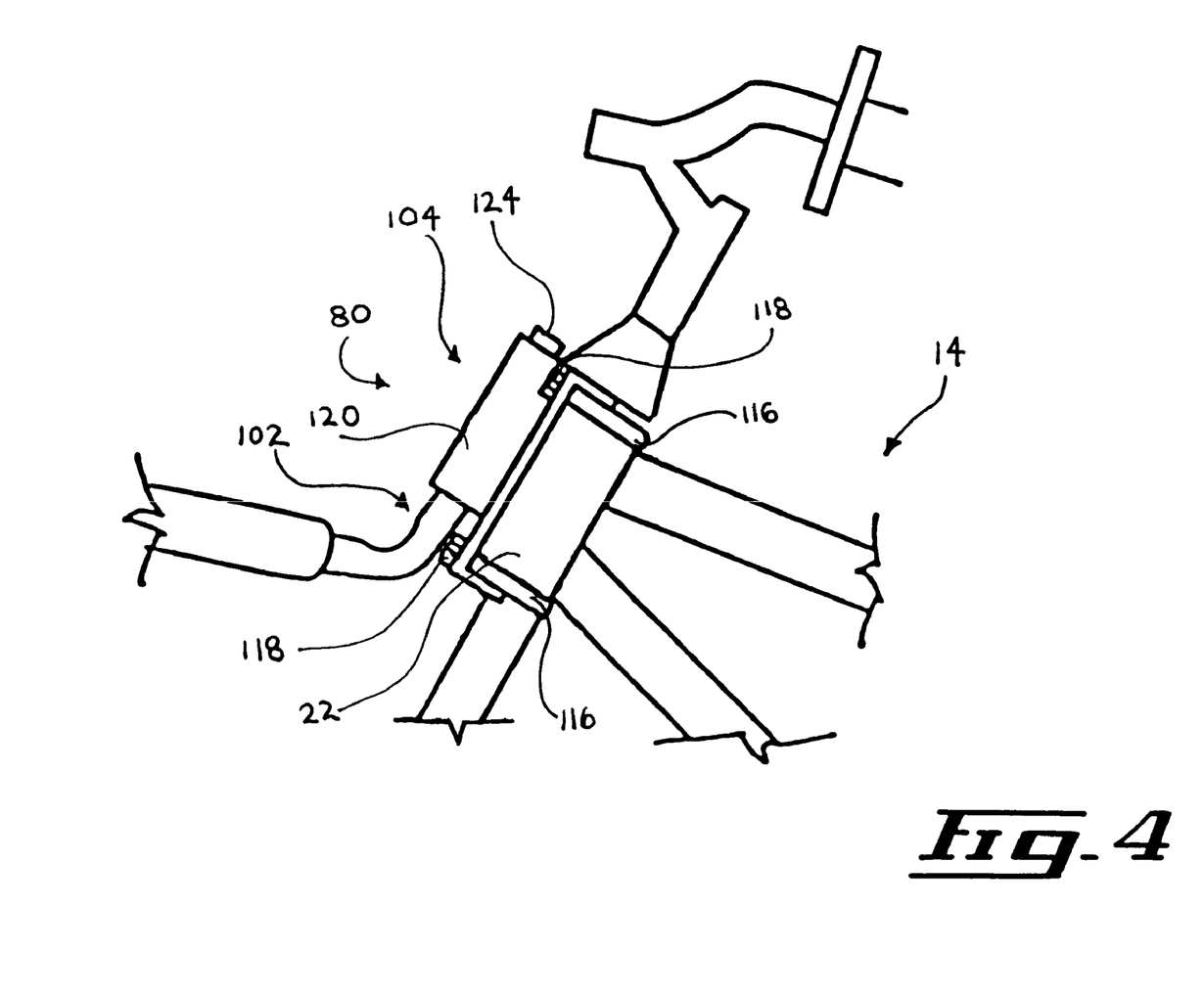
FIG. 4, in a partial elevational view with sections taken out, illustrates a second attachment component part of the coupling device shown in FIG. 1, the second attachment component being shown attached to the steering tube of the child's bicycle.
Figure 5:
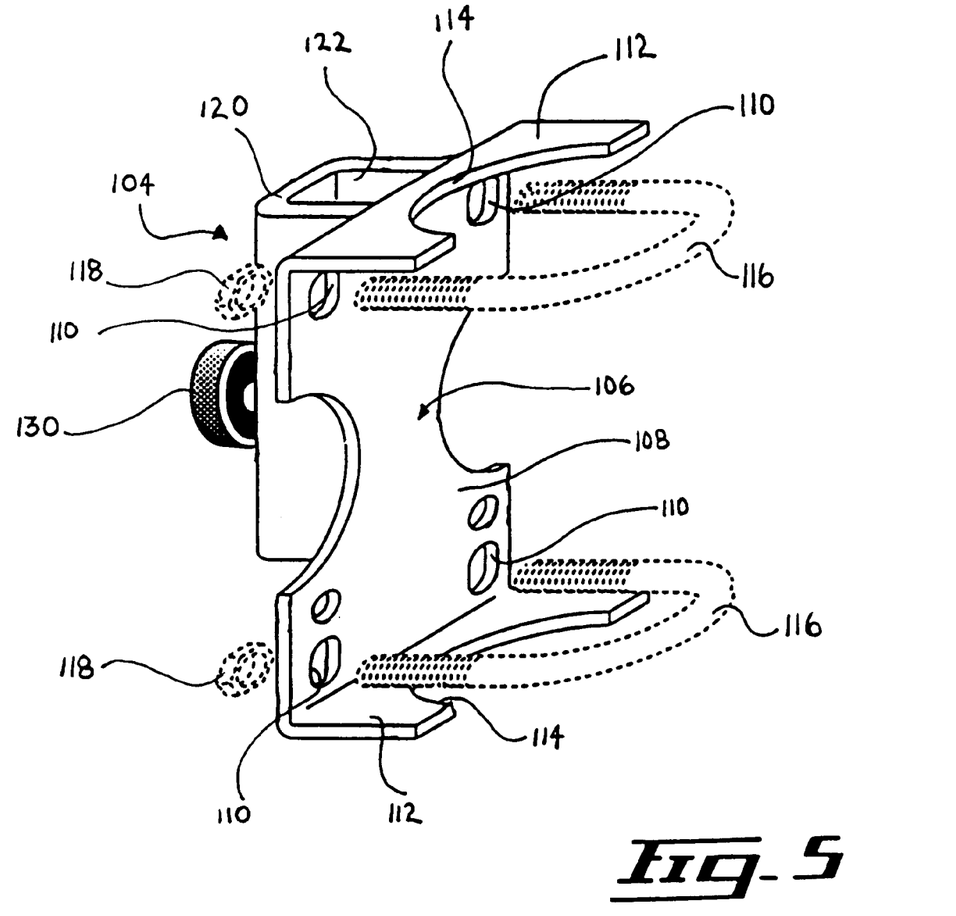
FIG. 5, in a perspective view, illustrates part of the second attachment component shown in FIG. 4.
Figure 6:
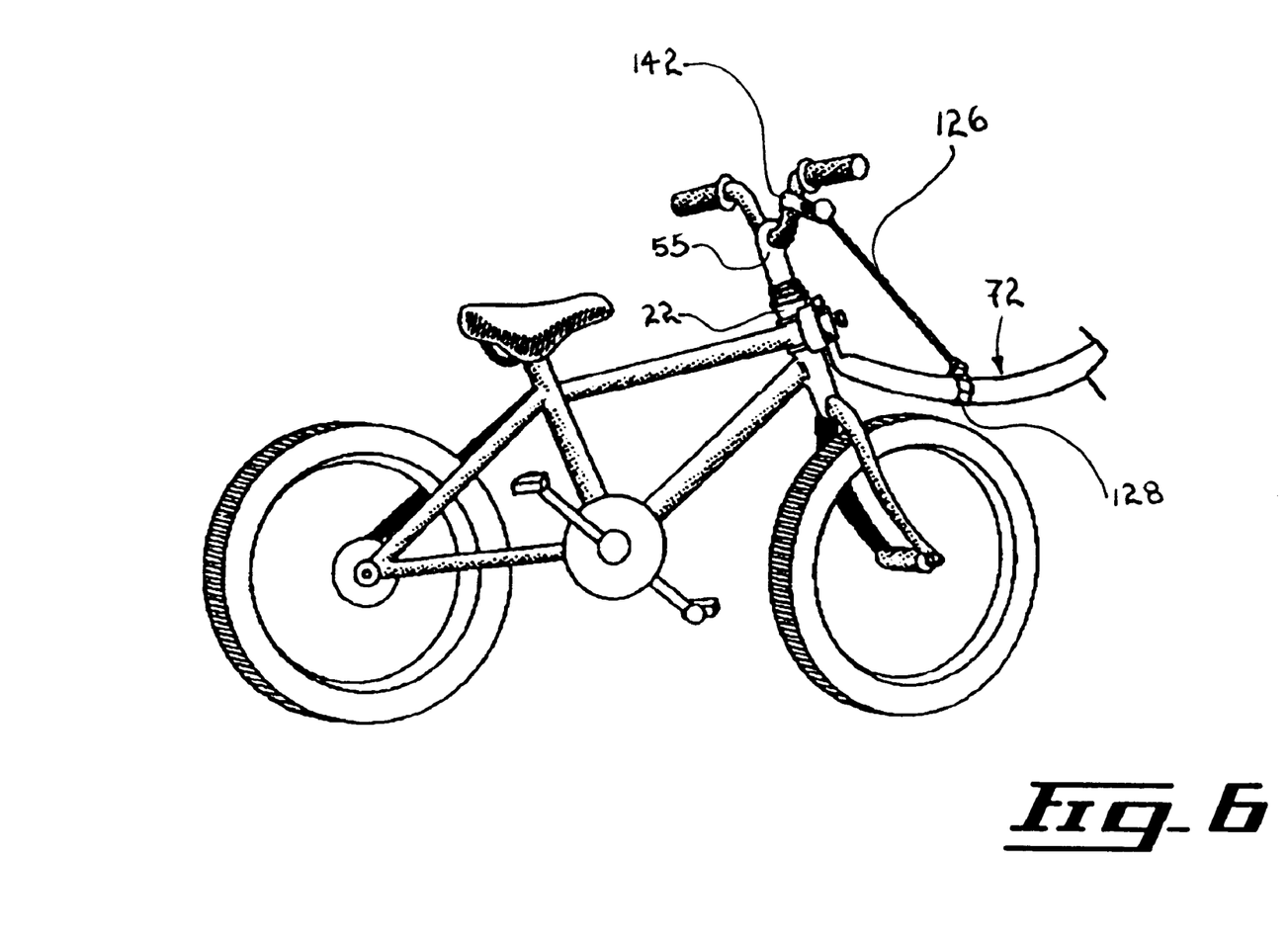
FIG. 6, in a partial elevational view with sections taken out, illustrates a second attachment component shown in FIG. 4 with the handle stabilizing component mounted thereon.

Referring now more specifically to FIGS. 4 through 6, there is shown in greater details the second attachment means 80. The second attachment means 80 includes a second bicycle attachment component 104 configured and sized so as to be attachable to a segment of the second bicycle 14. The second attachment means also includes a second bar attachment component 102 extending from the second longitudinal end 76.

The second bar attachment component 102 Is configured so as to be releasably attachable to the second bicycle attachment component 104. The second bicycle attachment component includes a gripping component for gripping the second head tube 22 and a connecting sleeve 120 mounted on the gripping component. The connecting sleeve 120 defines a corresponding sleeve channel 122.

The second bar attachment component 102 includes a generally elongated connecting stem 124 extending at an angle from the bar second longitudinal end 76. The connecting stem 124 is configured and sized so as to be substantially fittingly slideable within the sleeve channel 122.

The gripping component preferably includes a stabilizing plate 106 having a pair of lateral stabilizing flanges 112 extending substantially perpendicularly therefrom. Each stabilizing flange 112 has a generally arcuate stabilizing recess 114 formed thereon. Each stabilizing recess 114 Is configured and sized so as to fittingly receive at least a portion of the circumference of the second head tube 22.

The gripping component further includes a generally "U" shaped stabilizing component releasably mounted on the stabilizing plate 106 for cooperating with the stabilizing recesses 114 so as to encircle and frictionally engage the second head tube 22. In a preferred embodiment of the invention, the stabilizing plate has a pair of stabilizing apertures 110 extending therethrough.

The generally "U"-shaped stabilizing component includes at least one and preferably two "U"-shaped bolts 116 having threaded end sections and a corresponding set of stabilizing nuts 118. The end sections of the "U"-shaped bolts 116 are adapted to extend through the stabilizing apertures 110 and the stabilizing nuts 118 are adapted to be threadaly mounted on the threaded end sections so that the "U"-shaped bolts 116 can be used for squeezing the head tube 22 against the stabilizing recesses 114.

The configuration of both the connecting stem 124 and the sleeve channel 122 are such that the mere action of gravitational forces prevents the connecting stem 124 from being inadvertently retracted from the sleeve channel 122. However, in order to further secure the connecting stem 123 within the sleeve channel 122 a releasable locking means is preferably provided. The releasable locking means not only further secures the connecting stem 124 within the sleeve channel 122 but also prevents the connecting stem 124 from vibrating or otherwise moving within the channel 122.

The second bicycle attachment component 104 thus preferably further includes a releasable locking means mounted on the connecting sleeve 120 for releasably locking the connecting stem 124 within the sleeve channel 122. The releasable locking means preferably takes the form of a locking bolt 130 extending through a wall of the connecting sleeve 120 so as to frictionally engage the exterior surface of the connecting stem 124 when the latter is inserted within the sleeve channel 122.

The second connecting means 80 preferably also includes a handle bar locking means for locking said second handle bar 55 in a predetermined rotational relationship relative to said second head tube 22. The handle bar locking means is adapted to be attached both to the linking bar 72 and to the second handle bar 55. The hand bar locking means includes a generally elongated and substantially rigid rod 126 defining a rod first end and a longitudinally opposed rod second end. A first rod attachment means 128 for attaching the rod 126 to the lining bar 72 is mounted adjacent the rod first longitudinal end. A second rod attachment means 142 for attaching the rod 126 to the second handle bar 55 is mounted adjacent the rod second longitudinal end.

Figure 7:
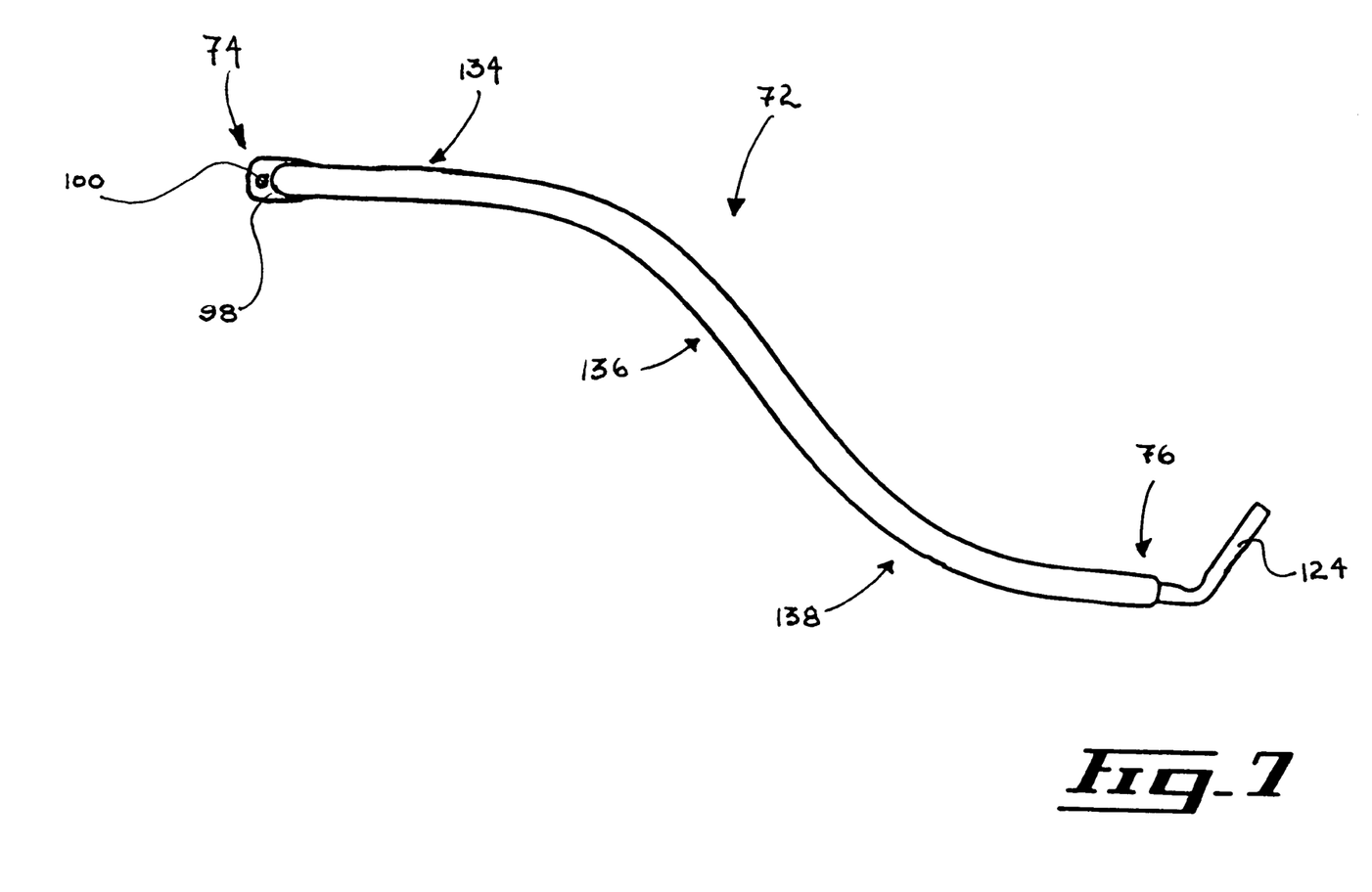
FIG. 7, in an elevational view, illustrates a linking bar part of the coupling device shown in FIG. 1.

One of the main characteristics of the present invention, as illustrated in FIG. 7, resides in the specific configuration and size of the linking bar 72. Indeed, since the device 10 is adapted to be used preferably although not exclusively to attach the bicycle of a child to the bicycle of an adult, the linking bar 72 is preferably given a specific geometry adapted to at least partially compensate for the frame and wheel height differences. Furthermore, the linking bar 72 is given a specific geometry such that the front wheel 38 of the second bicycle 14 will be in a spaced relationship relative to the ground surface 32 when the second bicycle 14 is being towed by the first bicycle 12.

The lining bar 72 preferably has a generally flattened "S" shaped configuration defining a first bar segment 134 extending into a second bar segment 136 in turn, extending into a third bar segment 138. The first bar segment 134 is adapted to extend in a generally horizontal direction and in an overlying relationship relative to the rear wheel 44 of the first bicycle 12 when the device is in use. The first bar segment 134 preferably bends integrally into the second bar segment 136. The second bar segment 136 is adapted to extend substantially rearwardly and downwardly relative to the first bar segment 134 when the device 10 is in use.

The second bar segment 136, in tun, preferably bends integrally into the third bar segment 138. The third bar segment 138 is adapted to extend in a substantially horizontal direction and in an overlying relationship relative to the forked tubes 58 of the front wheel 38 of the second bicycle 14 when the device is in use.

The length of the first bar segment 134 is such that it extends beyond the rear wheel 44 of the first wheel 12. Similarly, the length of the third bar segment 138 is such that is extends beyond the distal end of the forked tubes 58. The length and the direction of the second bar segment 136 are such that the front wheel 38 will be in a spaced relationship relative to the ground surface 132. As mentioned previously, this feature is particularly important since it prevents the creation of frictional and drag forces enhance, facilitates pulling of the second bicycle 14 by the first bicycle 12.

Figure 8:
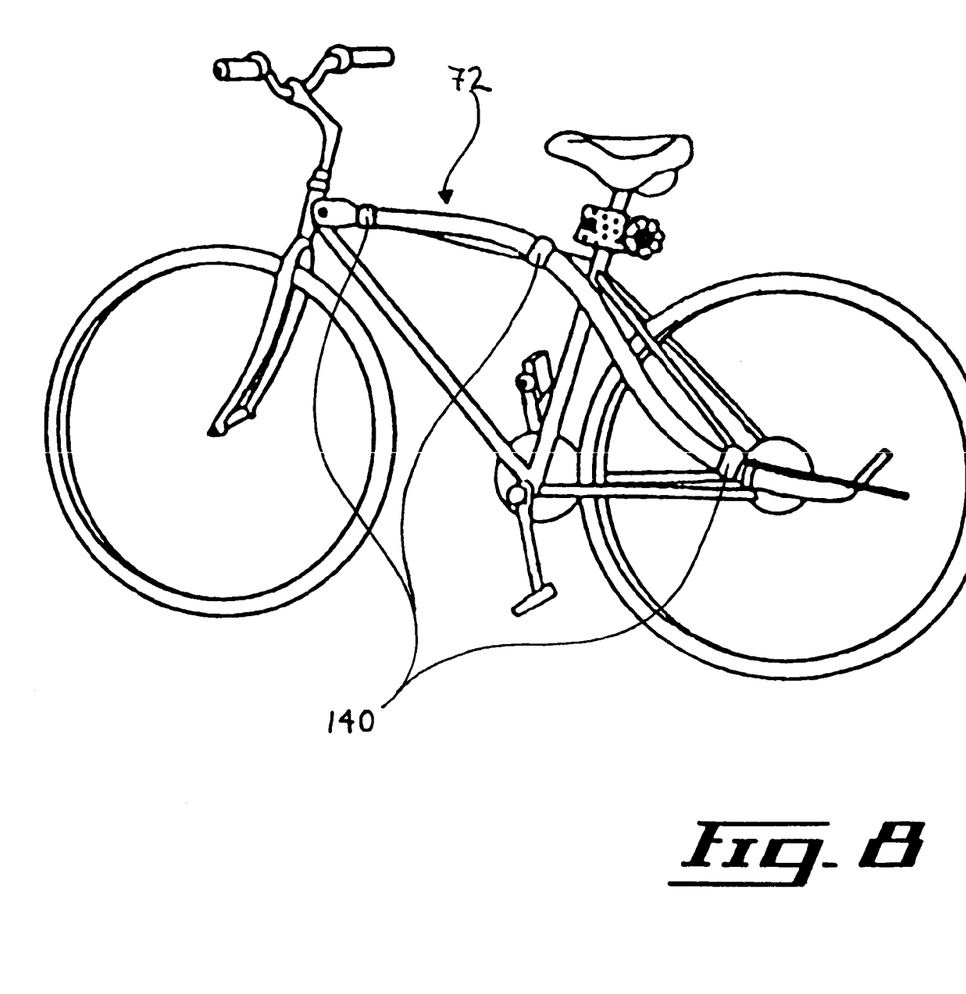
FIG. 8, in a perspective view, illustrates a lining bar part of the coupling device shown in FIG. 1 being transported mounted to the frame of the bicycle prior to being used for pulling a child's bicycle.

As illustrated more specifically in FIG. 8, the specific configuration of the linking bar 72 also allows the latter to be mounted on the first bicycle 12 when it is not used for puffing the second bicycle 14. The linking bar 72 can thus be carried to a location where it will be used for pulling the bicycle 14 without being cumbersome or interfering with the movement of the rider of the first bicycle 12. Indeed, its specific configuration substantially corresponds to that of the frame 16 of the first bicycle 12. The first bar segment 134 extends generally in the direction of the main tube 28 while the second bar segment 136 extends substantially in the direction of the seat stays 49. A set of straps 140 is adapted to be used for releasably securing the linking bar 72 to the first bicycle 12.

The embodiments of the invention in which an exclusive privilege or property is claimed are defined as follows:

1. In combination, a first bicycle, a second bicycle, and a coupling device for coupling said first bicycle to said second bicycle for enabling said first bicycle riding on a ground surface to pull said second bicycle, each of said first and second bicycles respectively having first and second front wheels, first and second rear wheels, first and second seat posts, first and second handlebars and first and second head tubes, said coupling device comprising:

a linking bar having a generally elongated configuration, said linking bar defining a bar first longitudinal end and an opposed bar second longitudinal end;

a first attachment means coupled to said linking bar adjacent said first longitudinal end releasably attaching said linking bar to said first bicycle;

a second attachment means coupled to said linking bar adjacent said second longitudinal end releasably attaching said linking bar to said second bicycle;

said linking bar being configured and sized such that said first bicycle front and rear wheels contact said ground surface, and said second bicycle rear wheel also contacts said ground surface but said second bicycle front wheel is in a spaced relationship relative to said ground surface.

2. A coupling device as recited in claim 1 wherein said first attachment means includes a first bicycle attachment component attached to a segment of said first bicycle and a first bar attachment component extending from said bar first longitudinal end, said first bar attachment component being pivotally and releasably attached to said first bicycle attachment component.

3. A coupling device as recited in claim 2 wherein said first bicycle attachment component includes a clamp releasably clamped around a section of said first bicycle.

4. A coupling device as recited in claim 3 wherein said clamp includes a pair of jaw members, each of said jaw members defining:

a generally arcuate segment encircling at least a section of said first seat post, said arcuate segment defining an arcuate segment first peripheral edge and an arcuate segment second peripheral edge;

a jaw linking segment extending from said arcuate segment first peripheral edge, the linking segments of both said jaw members linking together said jaw members;

a jaw connecting segment extending from said arcuate segment second peripheral edge, the connecting segment of both said jaw members connecting said first bar attachment component to said first bicycle attachment component.

5. A coupling device as recited in claim 4 wherein each of said jaw linking segments has a generally flat configuration and a linking segment aperture extending therethrough whereby said first seat post is sandwiched between said arcuate segments of said jaw members and said linking segment apertures are substantially in registry with each other for receiving the stem section of a linking bolt having a linking bolt head and a corresponding linking nut; said linking bolt head and said linking nut squeezing said linking segments towards each other.

6. A coupling device as recited in claim 4 wherein a substantially flat connecting tongue extends from said bar first longitudinal end, said connecting tongue having a tongue aperture extending therethrough;

each of said jaw connection segments having a generally flat configuration and a connecting segment aperture extending therethrough whereby said first seat post is sandwiched between said arcuate segments and said connecting tongue between said jaw connecting segments; said connecting segments apertures and said tongue aperture being in registry with each other so as to allow insertion of the stem section of a connecting bolt therein, said connecting bolt having a connecting bolt head and a connecting nut for squeezing said connecting segments against said connecting tongue.

7. A coupling device as recited in claim 6 wherein a knob is mounted on said connecting bolt head for facilitating manual rotation of said connecting bolt.

8. A coupling device as recited in claim 4 further comprising a generally cylindrical sleeve component inserted around said first seat post between said arcuate segments and said first seat post, said sleeve component being provided with a friction enhancing means formed on at least one of its surfaces for reducing relative movement between said first seat post and said arcuate segments.

9. A coupling device as recited in claim 1 wherein said second attachment means include a second bicycle attachment component attached to a segment of said second bicycle and a second bar attachment component extending from said bar second longitudinal end, said second bar attachment component being releasably attached to said first bicycle attachment component.

10. A coupling device as recited in claim 9 wherein:
    said second bicycle attachment component include a gripping component gripping said second head tube and a connecting sleeve mounted on said gripping component, said connecting sleeve defining a corresponding sleeve channel;
    said second bar attachment component including a generally elongated connecting stem extending at an angle from said bar second longitudinal end, said connecting stem substantially fittingly slideable within said sleeve channel.

11. A coupling device as recited in claim 10 wherein said gripping component includes a stabilizing plate having a pair of lateral stabilizing flanges extending substantially perpendicularly therefrom, each stabilizing flange having a generally arcuate stabilizing recesses formed thereon;
    each stabilizing recess fittingly receiving at least a portion of the circumference of said second head tube;
    said gripping component further including a generally "U" shaped stabilizing component releasably mounted on said stabilizing plate for cooperating with said stabilizing recesses so as to encircle and frictionally engage said second head tube.

12. A coupling device as recited in claim 11 wherein said stabilizing plate has a pair of stabilizing apertures extending therethrough and wherein said generally "U" shaped stabilizing component includes a generally "U" shaped bolt having threaded end sections and a corresponding pair of stabilizing nuts, said end sections extending through said stabilizing apertures and said stabilizing nuts threadably engaging said threaded end sections.

13. A coupling device as recited in claim 10 further comprising a releasable locking means mounted on said connecting sleeve releasably locking said connecting stem within said sleeve channel.

14. A coupling device as recited in claim 13 wherein said releasable locking means includes a locking bolt threadably mounted on said connecting sleeve to frictionally engage said connecting stem extending through said sleeve channel.

15. A coupling device as recited in claim 1 wherein said second connecting means further includes a handle bar locking means releasably locking said handle bar in a predetermined rotational orientation relative to said second head tube, said handle bar locking means being attached to said linking bar.

16. A coupling device as recited in claim 15 wherein said handle bar locking means includes a generally elongated and substantially rigid rod defining a rod first end and a longitudinally opposed rod second end;
    a first rod attachment means mounted adjacent said rod first end attaching said rod to said linking bar;
    a second rod attachment means releasably attaching said rod to said second handle bar.

17. A coupling device as recited in claim 1 wherein said linking bar has a generally flattened "S" shaped configuration defining a bar first segment extending into a bar second segment, said bar second segment extending into a bar third segment;
    said bar first segment extending in a generally horizontal direction and in an overlying relationship relative to said first rear wheel, said bar second segment extending substantially rearwardly and downwardly relative to said bar first segment and said bar third segment extending in a substantially horizontal direction and in an overlying relationship relative to said second front wheel.

18. A coupling device as recited in claim 17 wherein said bar first segment has a length of approximately 12", said bar second segment has a length of approximately 20", and said bar third segment has a length of approximately 10", said bar first and second segments defining a first angle therebetween having a value of approximately 60°; said bar second and third segment defining a second angle therebetween having a value of approximately 60°.

* * * * *